United States Patent [19]

Fukushima

[11] Patent Number: 4,844,225
[45] Date of Patent: Jul. 4, 1989

[54] FLYWHEEL ASSEMBLY
[75] Inventor: Hirotaka Fukushima, Hirakata, Japan
[73] Assignee: Kabushiki Kaisha Daikin Seisakusho, Osaka, Japan
[21] Appl. No.: 184,635
[22] PCT Filed: Jul. 29, 1987
[86] PCT No.: PCT/JP87/00562
§ 371 Date: Apr. 1, 1988
§ 102(e) Date: Apr. 1, 1988
[87] PCT Pub. No.: WO88/01028
PCT Pub. Date: Feb. 11, 1988

[30] Foreign Application Priority Data
Aug. 4, 1986 [JP] Japan .................. 61-182964

[51] Int. Cl.⁴ .................. F16F 15/12; F16F 15/30; F16D 3/14
[52] U.S. Cl. .................. 192/70.17; 192/70.27; 192/70.29; 192/70.3; 192/30 V; 74/574
[58] Field of Search .................. 192/70.17, 70.27, 89 B, 192/106.2, 30 V, 70.29, 70.3; 74/74; 464/68

[56] References Cited

U.S. PATENT DOCUMENTS 2,822,071  2/1958  Hautzenroeder .................. 192/70.3
4,751,993  6/1988  Fukushima .................. 192/106.1

FOREIGN PATENT DOCUMENTS 2903715   8/1980   Fed. Rep. of Germany ........ 74/574
3335982   4/1985   Fed. Rep. of Germany ... 192/30 V
2556799   6/1985   France .................. 192/89 B
57-18049  4/1982   Japan .
60-227019 11/1985  Japan .
61-201948 9/1986   Japan .
2153929   8/1985   United Kingdom .............. 192/48.1

Primary Examiner—Rodney H. Bonck
Assistant Examiner—David A. Testardi
Attorney, Agent, or Firm—Armstrong, Nikaido, Marmelstein, Kubovick & Murray

[57] ABSTRACT

A separated type flywheel assembly having a first flywheel and a second flywheel, a damper mechanism which damps vibration by the spring force and a friction damping mechanism which damps vibration by the friction force, a clutch engaging and disengaging lever slides the clutch disc pressure plate in clutch engaging mode and, in the clutch disengaging mode, disengages the friction damping mechanism from driving engagement with the clutch disc spline hub for transmitting power of the second flywheel to the spline hub of the clutch disc and connects the second flywheel with the first flywheel to prevent a resonance phenomenon.

7 Claims, 5 Drawing Sheets

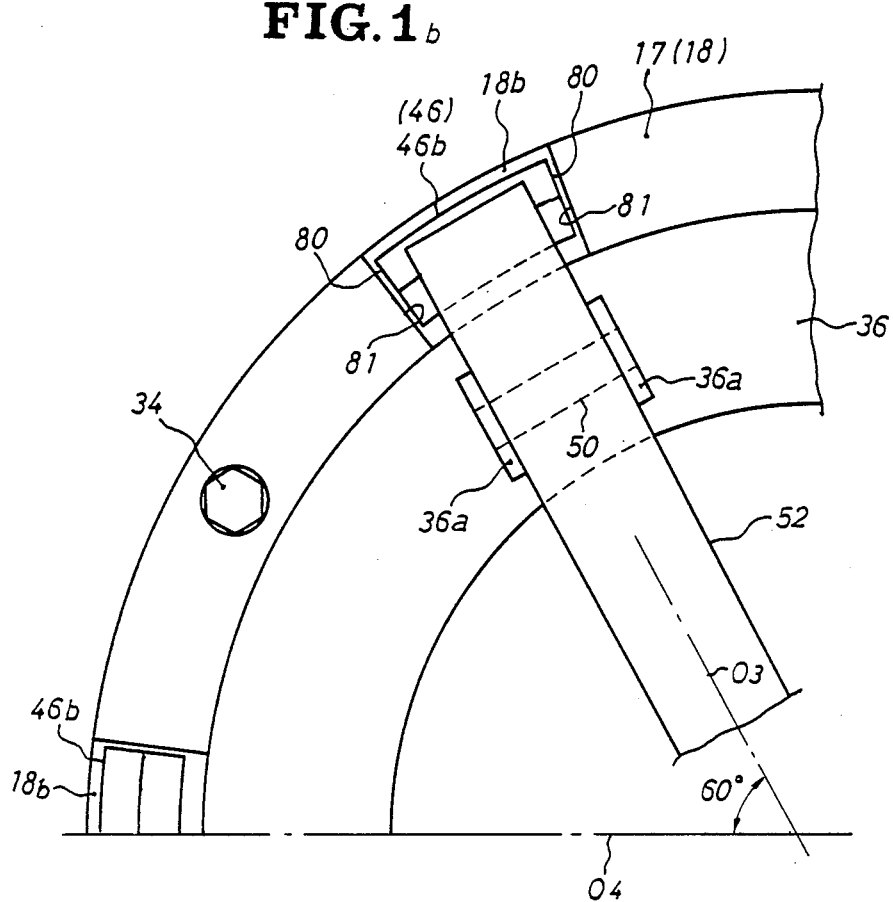

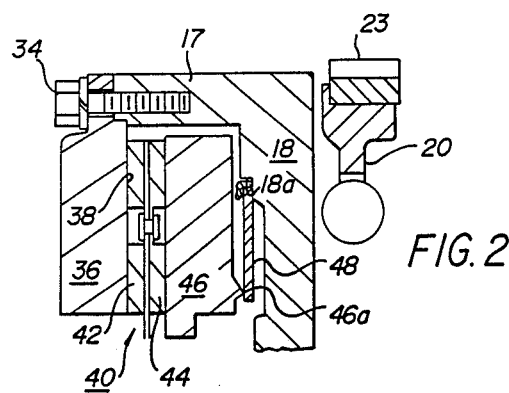
FIG. 2
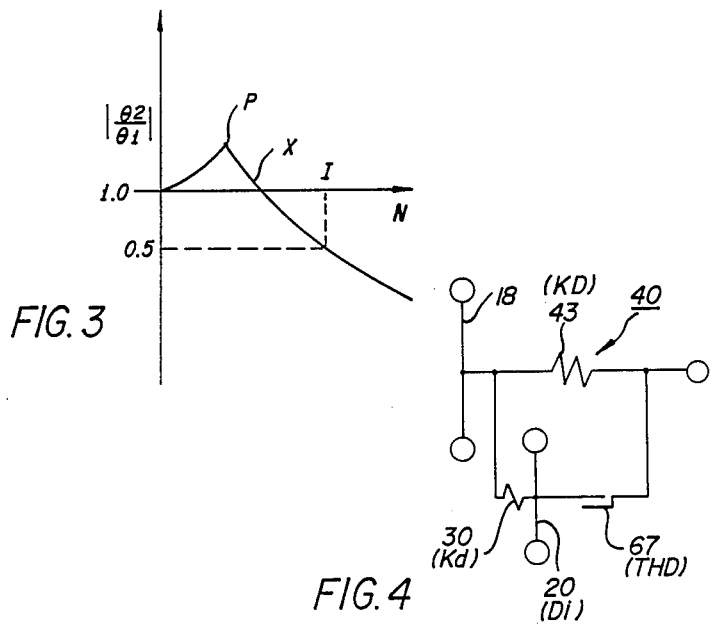
FIG. 3
FIG. 4

FLYWHEEL ASSEMBLY

TECHNICAL FIELD

The invention relates to a flywheel assembly for absorbing engine vibrations.

BACKGROUND ART

Prior hereto, the applicant of the present invention developed the engine vibrator absorbing flywheel described in Japanese patent application No. 60-44298 and corresponding U.S. patent application Ser. No. 836,365, now U.S. Pat. No. 4,751,993, dated June 21, 1988, and West Germany patent application No. P 36 07 3989-13 which are based on the Japanese patent application No. 60-44298.

In such prior flywheel, as shown in FIG. 5 hereof, a first flywheel 104 is fastened to an engine crank shaft 100 and engaged and disengaged by a clutch disc 102; a second flywheel 106 is installed concentrically with the first flywheel and set to a specified mass; a damper mechanism 108 resiliently couples the flywheels to each other; and, a friction damping mechanism 105 transmits output from the second flywheel 106 to spline hub 103 of the clutch disc 102 and damps vibration only when the clutch disc 102 contacts the first flywheel 104.

As shown in FIG. 6 hereof, the first flywheel 104 and second flywheel 106 absorb vibration transmitted from the crank shaft 100 with power, and the frictional damping mechanism 105 damps the vibration.

However, in such prior flywheel assembly hysteresis torque Thd generates between the hub flange 103 of the clutch disc 102 and the side plate 109 (FIG. 5). In some cases, the hysteresis torque Thd have an undesirable influence upon damping characteristics.

Further, the damping function of the frictional damping mechanism 106 for the second flywheel 106 comes to a stop, during clutch releasing operation in which the clutch disc 102 is disconnected from the first flywheel 104. It is possible that the second flywheel will have a resonance phenomenon depending on the frequency of the inputted vibration.

Disclosure of the Invention

An object of the present invention is to provide a flywheel assembly which can prevent the generation of hysteresis torque in a clutch equipped with a pull lever for engage/disengage operation.

Composition of the Invention (1) Technical measure

The present invention relates to a flywheel assembly including a first flywheel fixed to a crank shaft of an engine and a second flywheel installed concentrically with the first flywheel, the mass of the second flywheel being set to specified mass. A damper mechanism resiliently connects the flywheels with each other. A pressing plate is fixed to the first flywheel and is disposed to opposite the first flywheel and at a distance apart from the first flywheel. A clutch disc is installed to engage/disengage a face of the pressing plate opposite to the first flywheel. A pressure plate for the clutch disc engaging operation is provided between the clutch disc and the first flywheel. A spring member is provided to be shortened between the pressure plate and the first flywheel. A release lever is provided to be supported on the pressing plate, and so as to press the pressure plate toward opposite direction of the pressing plate against a spring force of the spring member in clutch releasing mode. A friction damping mechanism is provided to transmit power of the second flywheel to a spline hub of the clutch disc in clutch engaging mode. To restrict vibration of the second flywheel by the second flywheel, a friction damping mechanism is engaged between the first and second flywheel in clutch releasing mode.

(2) Function

The clutch disc engages/disengages the pressing plate. An axial pressure force of the clutch disc does not generate, and a hysteresis torque does not generate in the clutch disc, because the engage/disengage operation of the clutch disc is operated by pull-operation of the release lever.

In clutch releasing mode, the pressure plate restricts vibration of the second flywheel through the friction damper mechanism. The resonance phenomenon is prevented.

BRIEF DESCRIPTION OF THE DRAWINGS

FIG. 1b is a partial view of arrow "b" in the FIG. 1;

FIG. 1c is a sectional view taken on a line c—c of FIG. 1a;

FIG. 2 is a partial sectional view viewing in different sectional position with FIG. 1;

FIG. 3 is a graph showing a damping characteristic;

FIG. 4 is a schematic structure of the clutch shown in FIG. 1;

BEST MODE OF CARRYING OUT THE INVENTION

Figure 1:
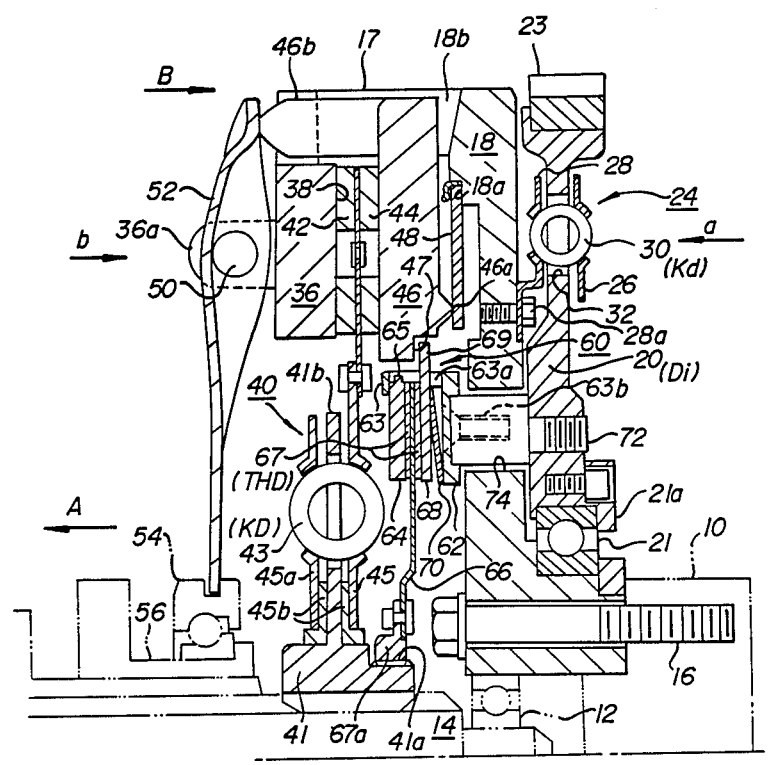
FIG. 1 is a partial vertical sectional view of a clutch applied with the present invention.

A clutch in accordance with the present invention will be described hereunder with reference to FIG. 1. In FIG. 1, numeral 10 is a rear end part of an engine crank shaft. In the rear of the crank shaft 10, i.e. to the left in FIG. 1, an input shaft 14 extends axially. The input shaft 14 connects a drive-transmission (not shown) to the rear stage of the clutch with a pilot bearing 12 between crank shaft 10 and input shaft 14.

A first flywheel 18 is fixed to the crank shaft 10 by bolts 16. The first flywheel 18 is formed into approximately disc-like shape, and set to specified mass corresponding to power characteristics of the engine. In the front face side of the first flywheel 18, a second flywheel 20 is installed concentrically to the first flywheel 18 with a bearing 21 therebetween. A damper mechanism 24 is disposed in second flywheel 20 in the radial direction. Damper mechanism 24 resiliently couples the first flywheel 18 and the second flywheel 20 in circumferential direction. Bearing holder 21a is fixed by bolts to the second flywheel 20.

The mass Di of the second flywheel 20 is set to a specified mass corresponding to an inertial mass of the transmission system, such as the speed changer (not shown) coupled to the rear stage of the clutch. Ring gear 23, on second flywheel 20, meshes with a pinion gear of a stater motor, not shown, on outer periphery of the second flywheel 20.

Damper mechanism 24 includes approximately annular shaped side plates 26, 28 and a torsion spring 30, with a inner part of the side plate 28 fixed to the first flywheel 18 by bolts 28a. The torsion spring 30 is set in a hole 32 of the second flywheel 20.

Figure 1C:
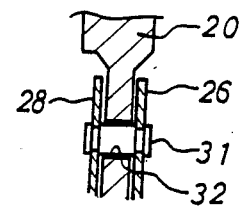
Figure 1A:
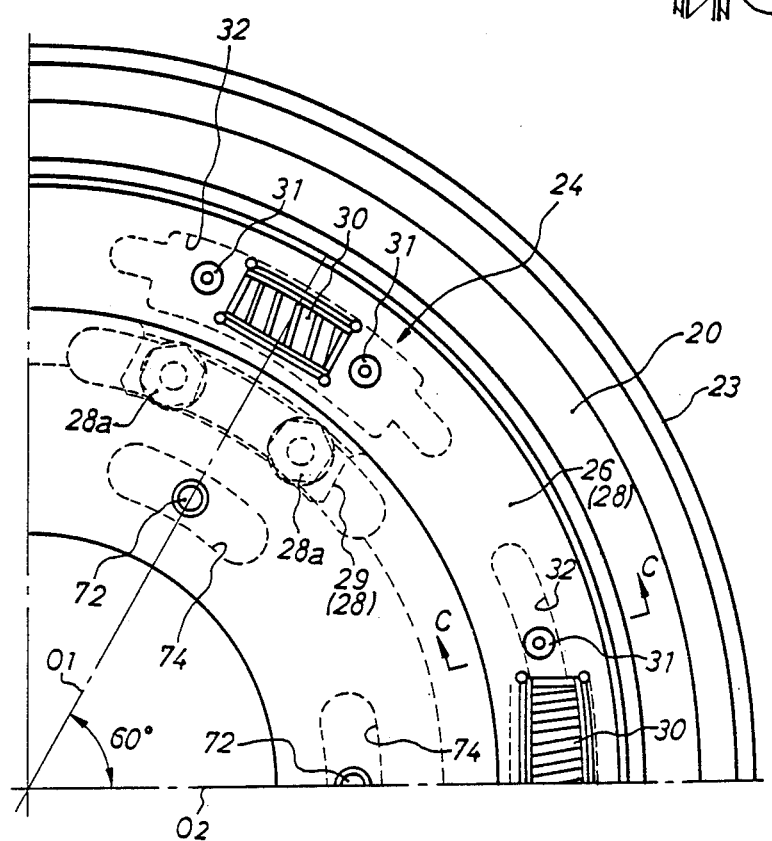
FIG. 1a is a partial view of arrow "a" in the FIG. 1.
Figure 5:
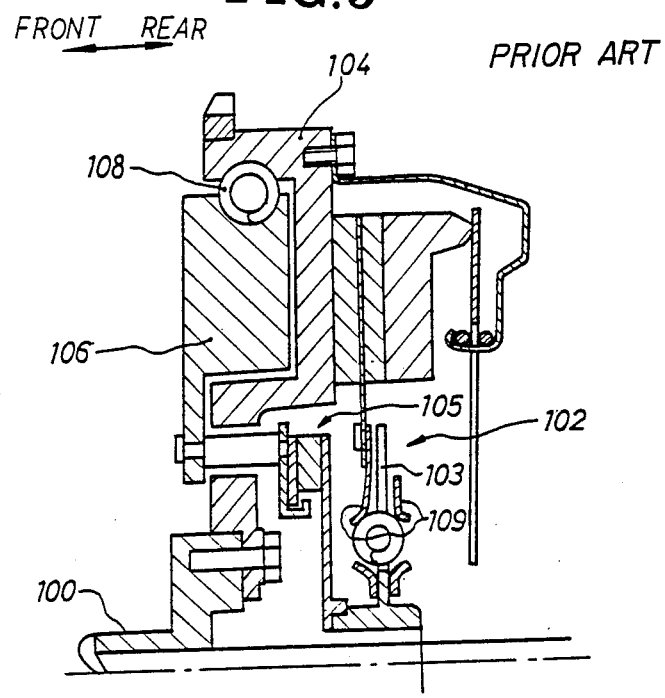
FIG. 5 is a schematic sectional view of my prior clutch.
Figure 6:
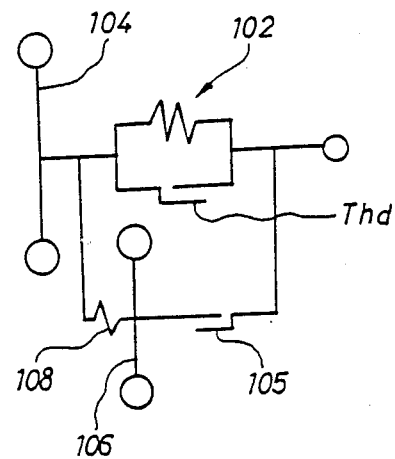
FIG. 6 is a schematic view of the clutch of FIG. 5.

In FIG. 1a showing partial view in the direction of arrow "a" of FIG. 1 the bolt 28a is screwed to the first flywheel 18 through flange part 29 which is formed at inner part of the side plate 28. The bolt 28a fixes side plate 28. Pins 31 are disposed on opposite sides of torsion spring 30 and interconnect side plates 26, 28 with each other as shown in FIG. 1c.

Torsion springs 30 are disposed at six places equidistant and circumferentially around the clutch. Adjoining torsion springs 30 are positioned with 60° distance between in circumferential direction as shown by the angle between center lines 01, 02, FIG. 1a. Flange parts 29 are disposed at three places with 120° distances provided therebetween in the circumferential direction.

The spring constant Kd of the torsion spring 30 is set to absorb the vibration of the engine power which is input to the first flywheel 18. As shown in FIG. 3, the spring constant Kd is set to a value that a resonance point P of a characteristic X representing a relation between a value of $|\Theta 2/\Theta 1|$ (absolute value) and an engine rotation speed N at a speed lower than an idling rotation speed I. The rate of change in angular speed for the first flywheel 18 is designated as $\Theta 1$ and a rate of change in angular speed for a clutch disc spline hub 41 is designated as $\Theta 2$.

At a normal speed region higher than the idling speed I, the value of $|\Theta 2/\Theta 1|$ decreases with an increase in the rotation speed so that the rate of change in angular speed $\Theta 2$ for the clutch disc spline hub 41, a rotational fluctuation of speed changer similar to a vibration, becomes small to such an extent as to be practically negligible.

FIG. 2 shows a vertical sectional view at a different sectional position circumferentially from the vertical section in FIG. 1. In FIG. 2, an annular flange part 17 is formed on the outer peripheral part of the first flywheel 18. A pressing plate 36 is fixed to an end face of the flange part 17 by bolt 34. The pressing plate 36 is opposed to and provides a specified spaced distance from first flywheel 18.

The pressing plate 36 is formed in an approximately annular shape and is continuous through the entirely circumferential. Facings 42, 44 of a clutch disc 40 are pressed between pressing plate 36, and a pressure plate 46. The pressure plate 46 is formed in a continuous annular shape.

Conical disc spring 48 is positioned between fulcrum land 46a of the pressure plate 46 and an annular stepped part 18a of the first flywheel 18. Conical spring 48 is approximately annular plate shaped. The spring force of conical spring 48 presses the pressure plate 46 in the pressing plate direction.

An inner part of the release lever 52, FIG. 1, is engaged with release bearing 54. An outer part of the release lever 52 engages projection part 46b connected to the pressure plate 46. The projection parts 46b are formed at six-places of the pressure plate 46 in circumferential direction and corresponding to release lever 52. On the flange part 17 of the first flywheel 18, hole 18b opens through the projection parts 46b. The projection parts 46b engages the side face of the hole 18b in circumferential direction.

The release lever 54 is set to a sleeve 56 which connects to a clutch pedal (not shown) for operation of the clutch.

In clutch releasing operation, the sleeve 56 is pulled in the direction of arrow A and the outer part of the release lever 52 presses the projection part 46b in the direction of arrow B.

As shown in FIG. 1b, showing a partial view at arrow b in FIG. 1, a shaft 50 is provided between two pivots 36a, 36a which are projected to form a fulcrum for the pressing plate 36. Side faces 80 of the projection part 46b are opposite to side faces 81 of holes 18b with clearance therebetween. The first flywheel 18 and the pressure plate 46 are engaged in circumferential direction to press opposite side faces 80, 81 axially in either direction of the pressure plate 46. Release levers 52, holes 18b, projection parts 46b etc. are disposed at six locations in the clutch with 60° equal distance in circumferential direction, as shown by center lines 03, 04, FIG. 1b.

A friction damping mechanism 60, FIG. 1, an essential point of the present invention, is described hereunder comprised a holder 62, a pressing plate 64, a friction disc 66, a pressure plate 68 and a conical disc spring 70. In clutch engaging operation, the facing 42, 44 of the clutch disc 40 are pressed between the pressing plate 36 and the pressure plate 46 and friction damping mechanism 60 damps vibrations of engine power transmitted form the crank shaft 10. Friction damping mechanism 60 transmits power of the second flywheel 20 to the spline hub 41 of the clutch disc 40.

The holder 62 is substantially annular shape and continuous in the clutch circumferential direction and is approximately L-shape having a flange part 63. Holes 63a are opened axially at four-places in circumferential direction of the holder 62. Holder 62 is fixed to connecting bolts 72 by screws 63b.

Holder 62 is connected to second flywheel 20 by connecting bolts 72 through the first flywheel 18. The connecting bolts 72 are disposed at six-places in circumferential direction of the clutch, through holes 74 (FIG. 1a) of the first flywheel 18. The bolts 72 and holes 74 are disposed at six-places, at the same location as the bolts, and form opening of a specified angles in the circumferential direction of the first flywheel 18, 60° apart in circumferential direction as shown by the center lines 01, 02 in FIG. 1a.

Pressing plate 64 is formed in substantially annular shape, with projections 65 at the outer periphery formed to set in holes 63a. At the first flywheel 18 side of the projection 65, in friction disc 66 is provided having friction faces of facing 67 on its opposite sides. The inner part of the friction disc 66 is connected to a boss 67a spline fitted to outer spline tooth 41a formed on a outer surface of the spline hub 41.

Bushings 45a are positioned between hub flange 41b of the clutch disc 40, clutch plate 45 and retaining plate 45a. The bushing 45b have low friction constant.

The friction damping mechanism 60 transmits power to the spline hub 41 from the second flywheel 20 by the friction disc 66 when clutch 40 is in engaging condition connecting the second flywheel 20 and spline hub 41 by a frictional force generated between the facings 67, pressing plate 64 and pressure plate 68.

The release lever 52 presses the pressure plate 46 toward the direction of arrow B, FIG. 1, in clutch releasing operation. In this instance, projection 69 of the pressure plate 68 is pressed by step part of the pressure plate 46, the pressure plate 68 sliding forward against the spring force of conical disc spring 70. The second flywheel 20 is engaged to pressure plate 46 by pressure plate 68 and conical spring 70. Thus, the friction damping mechanism 60 prevents a resonance phenomenon of the first flywheel 18 by restricting vibrations.

As shown in FIG. 4 which schematically illustrates the above-mentioned clutch construction, the clutch disc 40 is disposed in parallel with the second flywheel 20 at a rear stage of the first flywheel 18. A torsion spring 43 is provided in the clutch disc 40. In the second flywheel 20, the torsion spring 30 is installed in series with the facing 67 of the friction damping mechanism 60.

At the time of clutch engagement, the pressure plate 46 is pressed to the pressing plate 36, and the clutch disc 40 is pressed between the pressure plate 46 and the pressing plate 36 as shown in FIG. 1. The step part 47 of the pressure plate 46 releases projection 69 of the pressure plate 68 and pressure plate 68 is pressed toward pressing plate 64 by the spring force of the conical spring 70.

Power of the second flywheel 20 is transmitted to the spline hub 41 from the connecting bolt 72, the holder 62 and the friction disc 66. The engine power entered in the first flywheel 18 is transmitted to the said speed changer through two routes: i.e. a route through the clutch disc 40 to the input shaft 14 and a route from the second flywheel 20 through the friction disc 66 of the friction damping mechanism 60 to the speed changer.

Axial pressure force does not act on the clutch plate 45 and the retaining plate 45a, because the friction disc 66 of the friction damping mechanism 60 are pressed by the spring force of the conical spring. Thus, hysteresis torque is not generated on the bush 45b of the clutch disc 40.

Under the above clutch engaging mode, as for a torque (average torque+fluctuating torque) transmitted from the engine to the speed changer, fluctuating torque is removed by the second flywheel 20 and the pressure plate 68 of the friction disc 66. Only the average torque is transmitted through the clutch disc 40 to the speed changer. The second flywheel 20 is springy supported to float by the torsional spring 30 of the damper mechanism 24. Therefore, the engine rotational fluctuation and the torque fluctuation are substantially completely removed.

The pressure plate 68 is coupled to the pressure plate 46 by the projection 69 and the step part 47. The second flywheel 20 is coupled to the pressure plate 46 by the connecting bolt 72, the holder 72 and the pressure plate 68. Thus, vibration of the second flywheel 20 is restricted by the pressure plate 46.

In the clutch releasing mode, the projections 46b of the pressure plate 46 are pressed in the direction of arrow B, and the pressure plate 46 moves forward against the spring force of conical spring 48. Clutch disc 40 is released.

In this instance, the projection 69 of the pressure plate 68 are engaged by the step part 47 of the pressure plate 46, and pressure plate 68 slides forward against the spring force of the conical spring 70. When the pressure plate 68 moves forward, the engagement of friction disc 66 is released. Input shaft 14 is free and operation of the speed changer is easy.

The pressure plate 68 is coupled to the pressure plate 46 by the projection 69 and the step part 47. The second flywheel 20 is coupled to the pressure plate 46 by the connecting bolt 72, the holder 72 and the pressure plate 68. Vibration of the second flywheel 20 is restricted by the pressure plate 46.

Effect of the Invention

As described above, the flywheel assembly of the present invention including a first flywheel 18 fixed to a crank shaft 10 of an engine; a second flywheel 20 installed concentrically with the first flywheel 10 and a mass of the second flywheel 20 is set to specified mass. A damper mechanism 24 is provided and resiliently connects the flywheels 18 and 20. A pressing plate 36 fixed to the first flywheel 10 and is disposed opposite to the first flywheel 18 and spaced from the first flywheel 18 at a fixed distance. A clutch disc 40 is installed to engage/disengage on a face of the pressing plate 36 opposite to the first flywheel 18. A pressure plate 46 for the clutch disc engaging operation is provided between the clutch disc 40 and the first flywheel 18 with a conical disc spring 48 (spring member) between the pressure plate 46 and the first flywheel 18. A release lever 52 is supported on the pressing plate 36 for pressing the pressure plate 46 in opposite directions of the pressing plate against a spring force of the conical spring 48 in the clutch releasing mode. A friction damping mechanism 60 is provided to transmit power of the second flywheel 20 to the spline hub 41 of the clutch disc 40 in clutch engaging mode. Vibration of the second flywheel 20 by the pressure plate 46 through the friction damping mechanism 60 is provided in the clutch releasing mode.

In clutch engaging mode (connecting condition), as shown in FIG. 1, the step part 47 of the pressure plate 46 and the projection 69 of the pressure plate 68 are separated. The pressure plate 68 is pressed toward the pressing plate 64 direction by the spring force of the conical spring 70, engaging the friction disc 66 and the friction damping mechanism 60 prevents axial pressure force on the clutch plate 45 and the retaining plate 45a of the clutch disc 40. Hysteresis torque on the bushing 45b of the clutch disc 40 is not generated. Therefore, damping performance of vibration by means of the friction damping mechanism 60 is improved.

Next, in clutch releasing mode (disengage condition), the pressure plate 68 couples to the pressure plate 46 by the projection 69 and the step part 47, couples the second flywheel 20 to the pressure plate 46 by the connecting bolt 72. Holder 70 and the pressure plate 68 restrict vibration of the second flywheel 20 by the pressure plate 46. Therefore, the resonance phenomenon compared with the prior art is prevented.

I claim:

1. A flywheel assembly including a first flywheel fixed to an engine crank shaft of an engine; a second flywheel concentric with said first flywheel and having a specified mass; a damper mechanism resiliently connecting said flywheels to each other; a pressing plate fixed to said first flywheel, said pressing plate being disposed opposite said first flywheel and spaced from said first flywheel at a fixed distance; a clutch disc for engaging and disengaging a face of said pressing plate opposite to said first flywheel, said clutch disc having a spline hub; a clutch disc pressure plate between said clutch disc and said first flywheel; a spring member between said clutch disc pressure plate and said first flywheel; a release lever supported on said pressing plate and operable to move said clutch disc pressure plate in the opposite direction of said pressing plate against the spring force of said spring member thereby disengaging said clutch disc from said pressure plate; and a friction damping mechanism transmitting power of said second flywheel to said spline hub of said clutch when said clutch disc is engaged with said pressing plate and restricting vibration of said second flywheel relative to said first flywheel in response to the movement of said clutch disc pressure plate.

2. A flywheel assembly as set forth in claim 1, in which said first flywheel includes a flange part extending in a direction opposite to said second flywheel and forming an approximately cylindrical shaped sleeve.

3. A flywheel assembly as set forth in claim 2, in which said pressing plate is fixed on an end face of said flange part of said first flywheel.

4. A flywheel assembly as set forth in claim 2, in which said clutch disc pressure plate includes a projecting part projecting toward said release lever on an outer part of said clutch disc pressure plate, said projecting part projecting through a hole opening in said flange part of said first flywheel, said projecting part connecting said clutch disc pressure plate and said first flywheel for rotation together in the circumferential direction.

5. A flywheel assembly as set forth in claim 4, in which said release lever is disposed opposite to a clutch disc side end face of said pressing plate, an intermediate part of said release lever is pivoted on said pressing plate, an outer part of said releasing lever presses said projecting part and an inner part of said release lever fits onto a release bearing.

6. A flywheel assembly as set forth in claim 1, in which said friction damping mechanism is disposed in a space between said first flywheel, said clutch disc and said clutch disc pressure plate, said friction damping mechanism comprising an approximately annular shaped holder, a friction disc connected to said spline hub of said clutch disc, a friction disc pressing plate and a friction disc pressure plate engaging with the opposite faces of said friction disc, a conical disc spring pressing said friction disc pressure plate and a bolt connecting said holder to said second flywheel.

7. A flywheel assembly as set forth in claim 6, in which projections are formed on said friction disc pressing plate and extend radially outwardly through holes in said holder, said projections engaging a step part formed along the inner periphery of said clutch disc pressure plate when said clutch is in the disengaged mode, said projections separating from said step part when said clutch disc is in the engaged mode.

* * * * *